June 18, 1940. C. C. SHUTT ET AL 2,205,223

STARTING CONTROL FOR SYNCHRONOUS MOTORS

Original Filed Jan. 31, 1935   3 Sheets—Sheet 1

WITNESSES:

INVENTORS
Charles C. Shutt and
John W. Dowson.
BY
Paul E. Frier
ATTORNEY June 18, 1940.   C. C. SHUTT ET AL   2,205,223
STARTING CONTROL FOR SYNCHRONOUS MOTORS
Original Filed Jan. 31, 1935   3 Sheets-Sheet 2

WITNESSES:
E. A. M'Claskey.

INVENTORS
Charles C. Shutt and
John W. Dawson.
BY
Paul E. Friedemann
ATTORNEY

June 18, 1940. C. C. SHUTT ET AL 2,205,223
STARTING CONTROL FOR SYNCHRONOUS MOTORS
Original Filed Jan. 31, 1935   3 Sheets-Sheet 3

WITNESSES:
E.A. McCloskey
Wm. C. Groome

INVENTORS
Charles C. Shutt and
John W. Dawson.
BY
Paul E. Friedemann
ATTORNEY

Patented June 18, 1940

2,205,223

UNITED STATES PATENT OFFICE 2,205,223

STARTING CONTROL FOR SYNCHRONOUS MOTORS

Charles C. Shutt, East McKeesport, and John W. Dawson, Wilkinsburg, Pa., assignors to Westinghouse Electric & Manufacturing Company, East Pittsburgh, Pa., a corporation of Pennsylvania Application January 31, 1935, Serial No. 4,323
Renewed May 8, 1939

13 Claims. (Cl. 172—289)

Our invention relates to a system of control for electric motors and relates more particularly to a system of control for automatically starting synchronous motors.

It is well known and usual practice to start synchronous motors as induction motors and, to transfer the motors from induction motor operation to synchronous motor operation, various automatic control systems are known to the trade and to those skilled in the art. With all of such automatic starting control systems no provision is made to eliminate the undesirable surges occasioned or produced in the supply circuit during such transfer from induction motor operation to synchronous motor operation. Furthermore, such transition from induction motor operation to synchronous motor operation not only produces surges in the supply system but also mechanical shocks to the motor, to the load coupled to the motor and to the generator of the supply system.

A still more undesirable feature of operation of existing devices is that the motor may fail to synchronize because the pull-in torque that is developed by the motor when the excitation is applied at any particular instant may be less than the torque required by the load, with the result that the motor fails to synchronize, even though the normal torque required by the load is less than the maximum torque against which the motor will synchronize if the proper instant is selected for the application of the excitation. When the field is excited the surges and shocks are repeated continually until the load is removed or synchronization takes place. It is thus apparent that under such conditions the motor could normally drive the load if, at the moment transfer is attempted, its torque capacity could be increased sufficiently to effect synchronization.

It is well known to those versed in the art, that the maximum load which a given synchronous motor can accelerate from the balancing speed on its starting windings and synchronize varies with the relation in space of the rotor, or member which carries the field windings, with respect to the rotating vectors which represent the polyphase voltages impressed on the stator or armature windings, at the time of application of the direct current excitation voltage on the field windings.

One object of our invention, therefore, is to provide for effectively controlling the time of application of the excitation voltage to the field windings of a synchronous motor with reference to the alternating current wave form applied to the armature.

Another object of our invention is to provide for selecting any pull-in torque between the minimum and the maximum of any given synchronous motor.

A more specific object of our invention is to control the time of energization of the field winding of a synchronous motor with reference to any given point on a wave of alternating current supplied to the armature, or stator, of the motor.

Another object of our invention is to control the time of transfer of a synchronous motor from induction motor operation to synchronous motor operation so that the maximum load which the motor can accelerate consistently from the balancing speed on its starting windings and bring into synchronism is increased compared to the maximum load which the motor can accelerate consistently and synchronize without such control of the time of energization of the field winding.

A still further object of our invention is to minimize, or decrease, the transient pulsations of torque and current which always accompany, to a greater or less extent, the synchronizing of a synchronous motor.

Another object of our invention is to transfer a synchronous motor from induction motor operation to synchronous motor operation at such a time as to secure maximum pull-in torque.

It is also an object of our invention to provide for starting a synchronous motor by effecting transfer from induction motor operation to synchronous motor operation at a selected instant of time after a selected percentage of synchronous speed has been attained, to provide any selected pull-in torque for the motor between the minimum and the maximum of the particular motor being started.

A somewhat more specific object of our invention is to provide for starting a synchronous motor by effecting transfer from induction motor operation to synchronous motor operation when the motor has attained a certain percentage of synchronous speed and at an instant of time when the field windings of the motor are in a given position with reference to a selected point on a wave of the alternating current voltage supplied to the motor.

Another object of our invention is to control the time of transfer of a synchronous motor from induction motor operation to synchronous motor operation when the motor has attained a certain percent of synchronous speed as determined by the slip frequency of the motor and in such a manner that the maximum load which the motor can accelerate, consistently from the balancing speed as determined by the slip frequency of the motor, and bring into synchronism is increased compared to the maximum load which the motor can accelerate consistently and synchronize without such control of the time of transfer or of energization of the field windings.

A still further object of our invention is to minimize, or decrease, the transient pulsations of torque and current, which always accompany to a greater or less extent the synchronization of a synchronous motor during transfer from induction motor operation to synchronous motor operation, at a time when the slip frequency of the currents induced in a winding on the poles of a synchronous motor are a given value.

It is also an object of our invention to accelerate a synchronous motor as an induction motor until the percent slip is relatively small and thereafter to transfer the motor from induction motor operation to synchronous motor operation at such an instant of time as to secure a relatively large, or substantially maximum, pull-in torque.

It is also an object of our invention to provide means for automatically controlling the acceleration of a synchronous motor as an induction motor in response to the slip speed of the motor and thereafter to automatically change to synchronous motor operation at a selected time to secure a relatively large, or substantially maximum pull-in torque.

Other objects and advantages of our invention will become more apparent from a study of the following specification and the claims appended thereto when considered in conjunction with the accompanying drawings, in which:

Generally stated, our invention, disclosed and claimed in this application, embodies an automatic system of control for controlling the complete synchronization of a synchronous motor and the specific features thereof are utilized with a slip frequency system, the slip frequency being determined from the field windings or from a separate winding on the pole pieces, in combination with control means to automatically select a definite relation between the rotor and the rotating field at the moment of transfer to secure desired pull-in torque characteristics. In this application we, more specifically, disclose and claim slip frequency means, which means are broadly considered speed-responsive means, in combination with "angle switching" control.

In our copending application filed February 23, 1935, Serial No. 7,710, we have disclosed and claimed one related combination of our invention, and in our copending application filed January 31, 1935, Serial No. 4,322, we have disclosed and claimed a further related combination of our invention.

Figure 1:
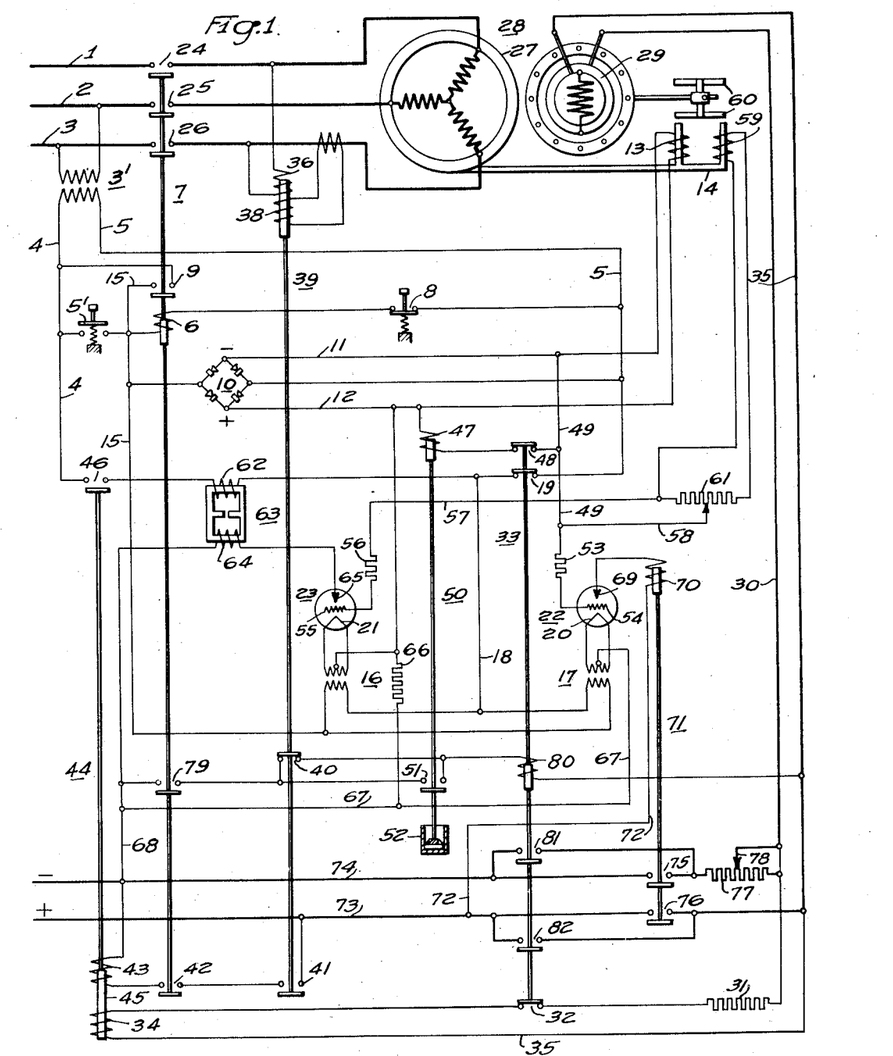
Figure 1 is a diagrammatic showing of an automatic slip-frequency starting control system in combination with mechanical means, electronic means, electromagnetic means, and other means illustrating the novel features of our invention.

If a slip frequency control system is utilized, as shown in Fig. 1, then the synchronous motor 28 will start to accelerate as an induction motor the moment the main contactor or switch 7 is operated to close contact members 24, 25 and 26. When the motor has attained a certain speed as determined, or measured, by certain slip frequency devices, as for instance the frequency relay 44, then the "angle switching" means automatically effect proper pull-in torque characteristics at the time of transfer. To produce such desirable synchronization of the motor, the field windings should become fully energized at a time having a definite relation to the alternating current waves of the current supplied to the stator. Ordinarily, the most desirable time will be at maximum pull-in torque.

Figure 8:
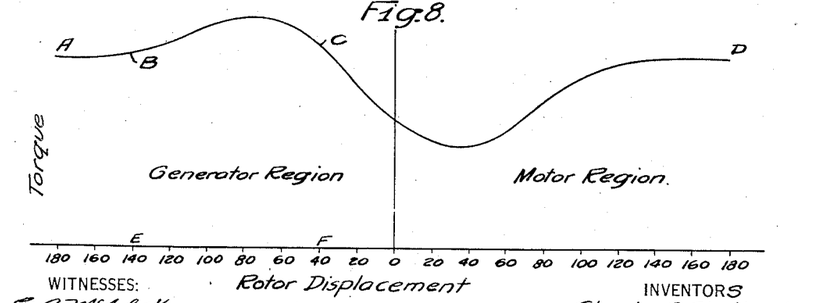
Fig. 8 shows the variations of starting torque for different angular positions of the rotor with reference to the impressed voltage.

In Fig. 8, the variations in torque are shown for different rotor positions with reference to the rotating field, measured in electrical degrees. Zero represents the position of the rotor when the motor is in synchronism at the particular instant and carrying no load. The portion marked Generator region corresponds to rotor positions in space ahead (in direction of rotation) of the no load synchronous position at any particular instant in that region that may be considered. The portion marked or designated Motor region corresponds to rotor positions behind the no load synchronous position at any particular instant in that region that may be considered.

In addition the motor, for the torque values included in the most favorable portion of the Generator region such as the ordinates of the section of the curve BC, will be synchronized while the rotor normally moves in space through not more than one pole pitch. This is the ideal region for synchronizing because the pull-in torque is high and, as a result, the torque and current pulsations will be a minimum.

For other switching angles to the right of F and to the left of E, the torque values as given by the curve portions AB and CD represent load torques against which the motor will ultimately synchronize, but ordinarily only after the rotor slips one or more poles. For torques less than those represented by the ordinates of the torque portions AB and CD, the number of poles which the rotor must slip decreases. In general, the motor will synchronize without slipping poles from any switching angle, even in the unfavorable regions, provided that the load torque is sufficiently reduced. By the use of our contribution to the art, the field windings may be fully excited at any point between A and D but to secure the full advantages of such selective control, the field will be caused to become fully excited while the rotors are in the favorable region, namely the angles between F and E.

The curve shown in Fig. 8 was determined from test data of a typical synchronous motor. For a given voltage and frequency supplied to a motor, the curve will, of course, vary (1) with a change of mechanical inertia of the moving elements, (2) a change in the excitation current of the field windings, (3) a change in the inductive time constant of the field winding circuit, and (4) the time consumed by the relays that must operate to apply the excitation.

Figure 4:
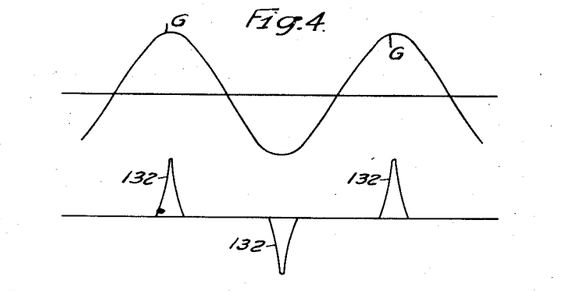
Fig. 4 shows wave diagrams of the energy supplied to the armature of a synchronous motor from the source of energy, and also shows the characteristics of energy transmitted by a surge transformer constituting part of our invention.
Figure 5:
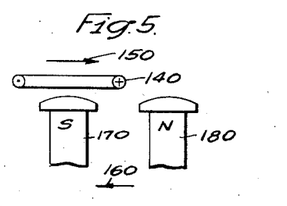
Figs. 5, 6 and 7 illustrate diagrammatically portions of a stator with reference to the poles of the field winding, and represent, respectively, the Generator Region, no-load position and Motor Region.
Figure 6:
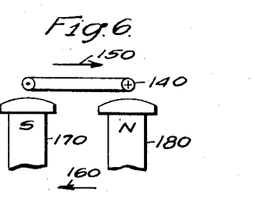
Figure 7:
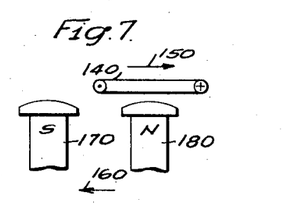

To amplify the explanation given in connection with Fig. 8, attention is called to Figs. 4, 5, 6 and 7. Let the upper portion of Fig. 4 represent the voltage impressed across one particular phase of the stator winding plotted against time. Let the check for rotor position, by the devices described more in detail hereinafter, be made at each of the points marked G. Let reference character 140 represent one of the coils in the phase across which the voltage shown in the upper portion of Fig. 4 is impressed. In Figs. 5, 6 and 7 sections of this coil are shown in the extreme end of the Generator region, no-load position, and extreme end of the Motor region, respectively.

Let the arrows designated by 150 represent the direction of rotation of the rotating field and let the polarities at the particular instant be as indicated adjacent the coil. Let the direction of slip be indicated by the arrows 160. Then if the poles 170 and 180 are energized with direct current and have the polarities shown, it will be apparent that the motor will fall into synchronism with a substantially maximum torque for the position shown in Fig. 5, which will be the most desirable operation. That is, for the positions ranging between that shown in Fig. 6 and Fig. 5 the rotor is in the most favorable Generator region.

In Fig. 6, the motor will be in synchronism and may, if the factors mentioned that influence synchronization are of the proper value, remain synchronized without slipping poles. For the position shown in Fig. 7, the chances are against smooth synchronization. In accordance with our invention, the field windings are fully excited when the rotor occupies the position shown in Fig. 5.

One of the essential features of our invention is, therefore, to determine the rotor position with reference to a given point at G in Fig. 4 on the wave of alternating current supplied to the stator. Our starting control, after a suitable impulse has been received from our devices, or system of control, indicating a proper speed of the motor, will apply the excitation voltage to the field windings at the first instant the relations of the rotor and rotating field are correct for maximum pull-in torque, or any other torque that may have been selected.

One set of means for determining the rotor position is shown at 14 in Fig. 1 and consists of one or a plurality of metal strips 60 of high permeability disposed axially of the rotor 27 of the motor 28 and coupled to the rotor shaft to rotate with the rotor. These metal strips are located on the center lines of the poles of the rotor, or any other position may be selected. When a plurality of strips are used there may be as many as one strip for every other pole around the rotor. The positions may not be on the center lines of the poles, but it is essential that the strips have some known positional relation to the pole pieces.

The strip or strips 60 pass under the poles of the electro-magnet 14 which has a winding 13 excited with direct current from a suitable source of direct current, as from the direct current terminals of a double wave rectifier 10 adapted to be energized with alternating current from two of the main buses, 1, 2, and 3 upon the operation of the line contactor 7.

As the strip or strips 60 pass the poles of the electro-magnet 14, bridging the poles, a voltage impulse is induced in the winding 59. This voltage impulse is impressed upon the resistor 61. The current surges in the resistor 61 cause a variation of potential of the grid 54 with reference to the cathode 20 of the electronic device 22. The action of the coil 59, acting alone, is not of sufficient magnitude to make the electronic device conducting, that is, is not of sufficient effect to cause the electronic tube 22 to break down, or discharge. Furthermore, no particular novel result would be secured if tube 22 should break down each time a voltage impulse were induced in coil 59, but the action of tube 22 would then only be to measure the slip frequency of the motor, or, what is more accurate, the impulses and in consequence the breakdown of tube 22 would be a measure of the speed of the motor.

To properly control the time of energization of the field winding 29 from the direct current buses 73 and 74 the breakdown of tube or discharge device 22 is made a function of the combined action of the voltage impulse of coil 59 and the voltage variations on grid 54 caused by the breaking down of discharge device 23.

An impulse transformer 63 causes the operation of discharge device 23.

The impulse transformer 63 has a primary winding 62 which is connected to be energized with alternating current, as illustrated in the upper portion of Fig. 1. The magnetic circuit of the impulse transformer is so designed that the voltage impulses 132 at the secondary winding are, as to position and magnitude, somewhat as shown in the lower portion of Fig. 4, or, to a different scale, in Fig 16.

The grid 55 of the electronic device, or tube 23, is connected through a resistor 56 and conductor 57 to the left-hand junction of the resistor 61, through a portion of the resistor 61 and through conductors 58 and 49 is connected to the conductor 11, coupled to the negative terminal of rectifier 10. The grid thus receives a certain negative bias with reference to the anode 65. The relation of the voltages of the cathode 21, grid 55 and anode 65 is so chosen that with each voltage impulse from the secondary winding 64 of impulse transformer 63 coincident with an impulse from coil 59 the tube 23 becomes conducting, or breaks down producing unidirectional current impulses.

Figure 15:
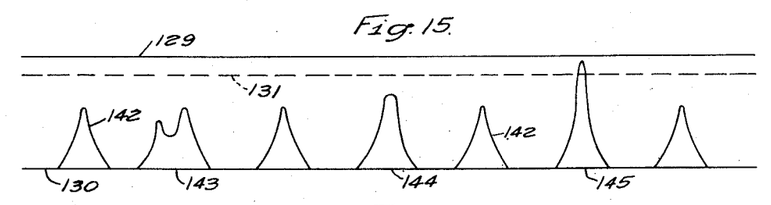
Figs. 15, 16 and 17 show graphically how the grid potential, as indicated by curve 130', of a field control electronic discharge device is caused to rise to within the range of the critical grid potential, indicated by curve 131, or breakdown voltage, of one of the discharge devices shown in Fig. 1.
Figure 16:
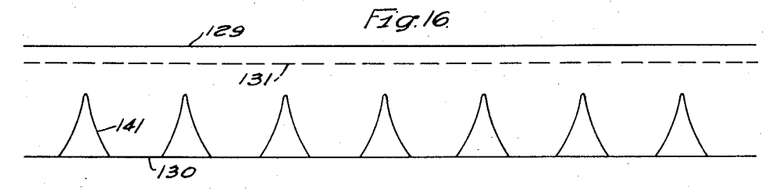
Figure 17:
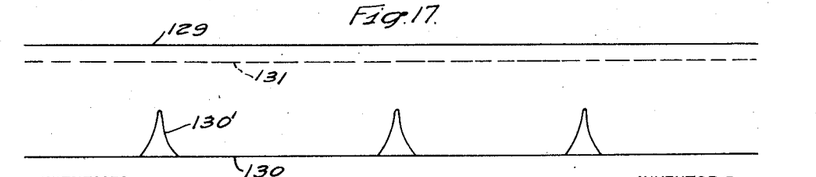

In Figs. 15, 16 and 17, curve 129 represents the anode potential of tube 23, whereas the curve 131 shown in dotted line shows the critical potential of tube 23. Each time the tube 23 breaks down and passes current as shown by curve 141 the potential on grid 54 is also varied and tube 22 breaks down. The effective, or positive, variations of grid bias caused by the impulse transformers only are shown by curve 141 in Fig. 16.

The design is such that the variations in grid bias are below the critical voltage of tube 23. Fig. 17 shows the variations in grid bias produced by the impulses of coil 59. These latter impulses are determined by the speed of the motor and since the motor at the balancing speed is still slipping with reference to the rotating field, the total effect on the grid 54 will be as indicated in Fig. 15. At the region 143, the curve 142 will be distorted, at region 144 there is less distortion and greater amplitude, and at 145 the amplitude is sufficient to intersect the critical potential for tube 22.

Reference character 145 designates the region at which time the rotor of the motor is in the desired position with reference to a given point on a wave of alternating current traversing the stator and producing the rotating field. The electromagnet 14 is designed to be adjustable circumferentially of the motor shaft so that any time of operation may be selected for the tube 23 with reference to the load torque curve shown in Fig. 8. The most desirable position of the electromagnet 14 is, of course, such that the field 29 becomes fully excited when the field pieces or poles are in the Generator region.

When the tube 22 becomes conducting, the high-speed field switch 71 is caused to operate, and the main field switch 33 is also caused to operate a short time after the operation of switch 71. The field 29 thus becomes energized and the motor is synchronized with maximum pull-in torque.

A better understanding of our invention can probably be had from a detailed description of the sequence of acceleration and operation of our invention for a typical starting and operating cycle of a synchronous motor.

Assuming that some main circuit-breaker is closed to energize the conductors 1, 2 and 3, then the transformer 3' will be energized and in consequence conductors 4 and 5 will also be energized. If the attendant wishes to start the motor 28, he actuates the push-button or starting switch 5', thereupon establishing a circuit from the energized conductor 4 through the switch 5', actuating coil 6 of the line switch or contactor 7, and the stop switch 8 to the energized conductor 5. The line contactor 7 establishes a holding circuit for itself through the contact members 9 which contact members also energize conductor 15 independent of the operation of the starting switch 5'. When the conductor 15 becomes energized, either through the starting switch 5', or the holding circuit through the contact members 9, the full-wave rectifier 10 is connected directly across energized conductors 15 and 5 and in consequence direct current conductors 11 and 12 become energized with a direct current potential of the polarities indicated. The coil 13 of the electro-magnetic device 14 is thus energized. This coil is disposed in an adjustable manner circumferentially of the shaft of the motor 28 and is adapted to cooperate with one or more bars of magnetic material 60 which are adapted to change the flux through the magnetic circuit of the electro-magnetic device 14.

The energization of conductors 15 and 5 also effects the energization of the transformers 16 and 17 from conductor 15 through the primary windings of the transformers, the conductor 18 and contact members 19 to the energized conductor 5. The filaments 20 and 21 of the respective electric discharge devices 22 and 23 thus become heated immediately after the starting switch 5' has been actuated and ample time is, therefore, provided for the electric discharge device to become fully heated when these devices are later called upon to break down and carry a discharge current.

Operation of the line contactor 7 closes the contact members 24, 25 and 26, thereby energizing the armature of the synchronous motor 28 and this motor begins to accelerate, operating as an induction motor.

It is well known that the field winding of an induction motor acts as the secondary of a transformer during induction motor operation and, in consequence, the field winding 29 will have alternating currents induced therein having a frequency determined by the slip speed of the motor. These alternating currents vary in frequency as the speed of the motor increases and discharge through a discharge circuit which may be traced through conductor 30, discharge resistor 31, back contact members 32 of the main field switch 33, retaining coil 34 of the frequency relay 44 and conductor 35 to the field winding 29.

During the induction motor operation, the power-factor of a synchronous motor is lagging and in consequence the power-factor relay 39 will have its actuating coils 36 and 38 suitably energized, and contact members 40 will be opened and contact members 41 will be closed. The operation of the line contactor 7 also closes the contact members 42 and 79. The closure of the contact members 42 establishes a circuit from the direct current bus 73 through contact members 41 and 42 and actuating coil 43 of the frequency relay 44 to the negative bus 74. The direct current buses 73 and 74 are connected to some suitable source of direct current having the polarities indicated.

The frequency relay 44, having the two coils 43 and 34, is designed to operate when the percent slip of the motor becomes quite small, that is, in the neighborhood of 2% to 5% of synchronous speed. To accomplish such operation, the coils 34 and 43 are designed to act in opposition on the armature 45 and the effect of coil 34 is so chosen that during the initial stages of induction motor operation, its effect will predominate considerably over the effect of the coil 43. However, when the motor is operating at a selected speed which may be somewhere near 95% to 97% or 98% of synchronous speed, the frequency relay 44 will operate to close the contact members 46.

Before the effects of the operation of the frequency relay are discussed, attention is called to the time-limit relay 50, which is energized from the direct current buses 11 and 12 by a circuit through actuating coil 47, back contact members 48 of main field switch 33 and conductor 49 to conductor 11. The time-limit relay 50 has a negligible time constant when it becomes energized so that contact members 51 are immediately closed. However, when the actuating coil 47 becomes deenergized, the dashpot 52 and the piston acting therein prevent the opening of the contact members 51 for an appreciable interval of time.

The grid 54 of the electric discharge device 22 is interconnected with the negatively energized conductor 11 by the conductor 49 and through the resistor 53. The grid 55 of the electric discharge device 23 is similarly connected to the negatively energized conductor 11 by a circuit extending from the grid 55 through the resistor 56, conductor 57, a portion of the resistor 61, and conductors 58 and 49 to the conductor 11. A different negative bias is provided for each of the respective electric discharge devices.

One portion of the electro-magnetic device 14 is provided with a coil 59 which will, of course, be energized by impulses each time the bars of magnetic material, namely the bars 60, pass the electro-magnetic device 14. Current impulses are thus produced in the resistor 61 to momentarily change the grid bias of the electric discharge device 23. The design is, however, such that the variations in grid bias caused by the coil 59 are insufficient to cause a breakdown of the electric discharge device 22, and this electric discharge device only breaks down when the electric discharge device 23 has become conducting. The variations in grid potential occasioned by the coil 59 are illustrated in Fig. 17 and are, of course, of varying frequencies depending upon the change in speed of the synchronous motor.

Figure 9:
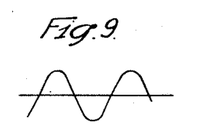
Figs. 9, 10 and 11 show graphically how the frequency of the currents induced in the field winding of a synchronous motor, or a separate winding on the pole pieces of the motor, decrease from a given frequency as shown in Fig. 9 to lower and lower frequencies, as shown in Figs. 10 and 11, as the motor accelerates during induction motor operation.
Figure 10:
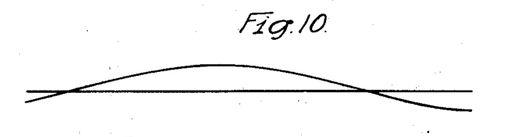
Figure 11:
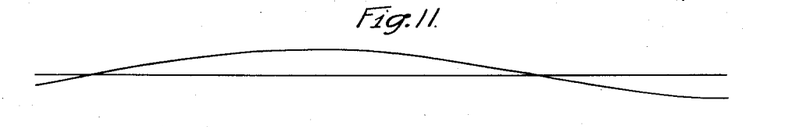

As the motor accelerates, as hereinbefore stated, the frequency of the currents induced in the field winding 29 vary as indicated in Figs. 9, 10 and 11, respectively.

When the frequency becomes rather low so that the no current periods become comparatively long, then the effect of the coil 34 of the frequency relay 44 will become negligible during such periods and in consequence the contact members 46 will become closed, thereby establishing a circuit through the primary winding 62 of the impulse transformer 63.

The secondary winding 64 of the impulse transformer 63 will thereupon establish voltage impulses between the anode 65 and the cathode or filament 21 of the electronic discharge device 23, which voltage impulses, considering only the useful portion of the wave, are designated by Fig. 16. Since the impulse transformer 63 is interconnected with the transformer 3' and thus with the buses 2 and 3, the frequency of the impulses as shown by the curve 141 with reference to the no voltage line 130 will be equal to line frequency. Furthermore, the discharge device 23 has its grid so controlled that it will, after the energization of the transformer, break down and carry current when the impulses of the impulse transformer and the impulses of coil 59 coincide.

The closed circuit for the electronic discharge device 23 may be traced from the right terminal of the secondary winding 64 to the anode 65, cathode 21 of the electric discharge device 23, the resistor 66, and conductors 67 and 68 to the negative bus 74 and also to the left terminal of the secondary winding 64.

The variations of grid potential of the electric discharge device 22 will thus be of the nature indicated in Fig. 15. The grid potential will be influenced both by the breakdown of the electric discharge device 23 and the impulses coming from the coil 59 but primarily by the discharge device 23.

In Fig. 15, it will be noted that at the region 143, there is no synchronism between the impulses of the coil 59 and the impulses occasioned by transformer 63. At the region 144, the two impulses are more nearly in synchronism whereas at the region 145, there is substantial synchronism and in consequence the magnitude of the grid potential variation is sufficient to equal or exceed the critical potential 131 with reference to the anode potential 129, and in consequence the high-speed field switch 71 will be energized the very first time the rotor of the synchronous motor holds a desired position with reference to the rotating field after the closing of the contact members 46.

The high-speed field switch 71 will be energized by reason of the breakdown of the discharge device 22, which breakdown circuit may be traced from the positive bus 73 through conductor 72, actuating coil 70 of the high-speed field switch 71, anode 69, cathode 20, and conductors 67 and 68 to the negative bus 74. Operation of the high-speed field switch 71 closes the contact members 75 and 76, thereby energizing the field winding 29 from the buses 73 and 74 through the field rheostat having the resistor 77 and the adjustable arm 78.

The instant contact members 76 are closed, a circuit is established from energized conductor 68 through contact members 79 and 51, actuating coil 80 of the main field switch 33, and contact members 76 to the positive bus 73. Energization of the main field switch 33 closes the contact members 81 and 82, and after these contact members have been closed, the contact members 32 are opened to open the discharge circuit of the field winding 29 through the discharge resistor 31.

Operation of the main field switch 33 opens the contact members 48, thereby deenergizing the actuating coil 47 of the time-limit relay 50, which thereupon begins to act in a downward direction and, after an interval of time which is selected to be of sufficient length to insure that the synchronous motor has pulled into synchronism, opens the contact members 51. Since the time constant of the time-limit relay 51 is selected to be of sufficient length to provide stable operation, the power-factor will be somewhere near unity and contact members 40 will have closed so that the energized circuit for the actuating coil 80 of the main field switch 33 is thus not interrupted by the opening of the contact members 51.

The operation of the main field switch 33 also opens the contact members 19, thereby deenergizing the primary winding 62 of the impulse transformer 63, whereupon the portion of our control which selects the instant of the transfer from induction motor operation to synchronous motor operation, is disconnected from the source of alternating current.

The opening of the contact members 51 of the time-limit relay 50 shifts the control of the energization of the actuating coil 80 of the main field switch from the time-limit relay to the power-factor relay 39. Since the power factor will be somewhere near unity or leading during synchronous operation, the contact member 40 will be closed and the contact members 51 will, of course, be open. In the case of an excessive overload or a full-out of the synchronous motor 28, the power-factor relay will open the contact members 40 thereby deenergizing the actuating coil 80 of the main field switch 33, which thereupon closes the contact members 32 to establish the discharge circuit for the field winding 29, and a moment thereafter the contact members 81 and 82 are opened and the direct current excitation is removed from the field winding 29.

The cycle of operation, namely of resynchronization, now takes place as in the first instance of starting and the motor is again brought up to synchronous speed with a selected desirable pull-in torque, but if the conditions that caused the pull-out still obtain, synchronism cannot, of course, be effected and the motor will be disconnected from the source of alternating current by suitable overload control devices not herein disclosed, inasmuch as such devices constitute no part of our invention.

Figure 2:
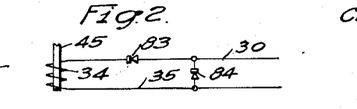
Fig. 2 shows the connection of the field frequency relay when using a half-wave rectifier.
Figure 12:
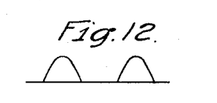
Figs. 12, 13 and 14 show graphically how the "no-current" time intervals for half-wave rectified currents increase in length as the frequencies of the induced currents in the field windings decrease with an increase in speed of the motor.
Figure 13:
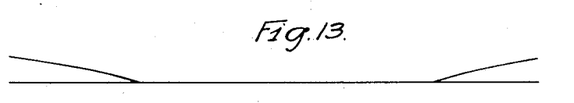
Figure 14:
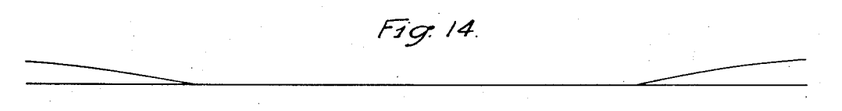

In some instances, it may be desirable to use a frequency relay that is not as accurately designed as the frequency relay shown in Fig. 1. To nevertheless effect accurate control of the synchronous motor, the retaining coil 34 of a frequency relay may be interconnected with the field winding through a pair of half-wave rectifiers 83 and 84, as shown in Fig. 2. The current effect in coil 34 will thus be as indicated successively in Figs. 12, 13 and 14, and the no-current periods will, of course, increase as indicated in these figures. It is, therefore, clear that a relay that is not very sensitive will operate at the proper time when the no-current period becomes relatively long as is indicated in Fig. 14.

The rectifier 84 connected across the conductors 30 and 35 is used mainly to effect a continuous discharge of the alternating currents induced in the field winding. This will be accomplished because for one-half of the cycle of the alternating current induced in the field winding 29, rectifier 83 will permit the current to pass through coil 34 and the discharge resistor, whereas during the other half of the cycle, the rectifier 84 will permit the current to circulate through the discharge resistor only.

Figure 3:
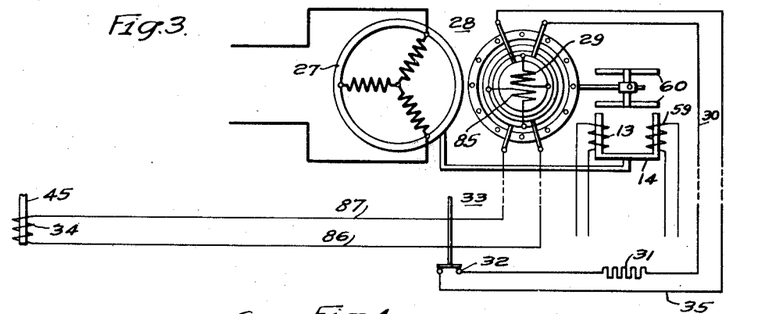
Fig. 3 is a diagrammatic showing of a portion of an automatic slip frequency control system showing how a separate coil on the pole piece or pole pieces of a motor may be connected to actuate a frequency relay.

In Fig. 3, a somewhat modified frequency control is shown in combination with our system of control, such as is shown in Fig. 1. In this modification, the currents induced in the field winding 29 discharge through the conductor 30, discharge resistor 31, the back contact members 32 of the main field switch 33, and through conductor 35 back to the field winding. In other words, the currents induced in the field windings themselves do not control the operation of a frequency relay. A separate coil or a plurality of coils 85 may be mounted on one or all of the pole pieces of the synchronous motor, and such coil or coils 85, acting as a secondary of a transformer, will have alternating currents discharge through the conductor 86, the retaining coil 34 of a frequency relay such as 44 and conductor 87 back to the coil 85. The effect of coil 85 is in every respect similar to the effect of the field winding 29.

We are, of course, aware that the foregoing disclosure, taken in conjunction with the drawings, discloses but few modifications of our invention, but that others skilled in the art and particularly after having had the benefit of the teachings of our invention may be able to devise other modifications falling within the spirit of our invention. We, therefore, do not wish to be limited to the particular modifications hereinbefore described, but wish to be limited only by the pertinent prior art and the scope of the appended claims.

We claim as our invention:

1. A starting control system for a synchronous motor comprising, in combination, a synchronous motor having a stator, provided with an armature winding, a rotor provided with a field winding, and a starting winding, a source of alternating current, means adapted to connect the armature winding to the source of alternating current to start the motor as an induction motor, a source of direct current, a field switch adapted to connect the field winding to the source of direct current, an electric discharge device adapted, when discharging, to cause the operation of said field switch, an impulse generator and impulse means producing voltage impulses having frequencies equal to the frequency of the currents supplied to the armature by said source of alternating current and a frequency proportional to the rotor slip, respectively, acting jointly on said electric discharge device to cause the same to break down or discharge when the field winding has a selected position with respect to the phases of the rotating field in the armature winding, and means responsive to the frequency of the currents induced in a winding on the poles of the motor to initiate the controlling effect of said impulse generator and impulse means on the electric discharge device.

2. In a system of control for starting a synchronous motor, in combination, an impulse generator, mounted in a selected relation with reference to the field windings of the motor, adapted to generate an impulse of electric energy, which impulses will thus indicate each time the field winding occupies a given position in space, impulse means energized from the source of supply of alternating current whereby impulses are produced of a frequency equal to the frequency of the supply, control means, responsive to the combined impulses of the impulse generator and the impulse means, adapted to energize the field winding with direct current, and means, responsive to the slip speed of the motor, adapted to initiate the operation of said control means.

3. A starting control system for a synchronous motor comprising, in combination, a synchronous motor having an armature winding, a starting winding, and a field winding, a source of alternating current, means for connecting said source of alternating current to the armature winding to start the motor as an induction motor by the action of said starting winding, a discharge circuit for the field winding, field switching means adapted to connect said field winding to the source of direct current and a moment thereafter to open the discharge circuit for the field winding, control devices, a frequency relay interconnected with the field winding and adapted to connect said control devices to be energized at a certain low frequency of the currents induced in the field winding, said control devices including an electric discharge device, an impulse generator adapted to act on the discharge device each time the field winding takes a given position in space, and impulse means adapted to also act on the discharge device each time the rotating field in the armature has a given phase position, said discharge device being designed to become operative only when the effect of the impulse generator and the impulse means are in synchronism, and means controlled by said electric discharge device to cause the operation of the field switching means.

4. A starting control system for a synchronous motor comprising, in combination, a synchronous motor having an armature winding, a starting winding, and a field winding, a source of alternating current, means for connecting said source of alternating current to the armature winding to start the motor as an induction motor by the action of said starting winding, a discharge circuit for the field winding, field switching means adapted to connect said field winding to the source of direct current and a moment thereafter to open the discharge circuit for the field winding, control devices, a frequency relay interconnected with the field winding and adapted to connect said control devices to be energized at a certain low frequency of the currents induced in the field winding, said control devices including an electric discharge device, an impulse transformer, energized from the source of alternating current, adapted to cause said discharge device to become conducting for an instant each time the rotating field in the armature is in a given position, a second electric discharge device, an impulse generator adapted to generate an impulse of energy each time the field winding takes a given position in space, said second discharge device being connected to be influenced by the impulse generator and the first-named discharge device, and adapted to become conducting the first instant of synchronous effect after the operation of the frequency relay, and means controlled by said discharge device to cause the operation of said field switching means.

5. In a system of control for starting a synchronous motor having an armature winding and a field winding, means for producing a rotating field in the armature winding to start the motor as an induction motor, means for measuring the speed of the motor, automatically operable high-speed transfer means, energized by the speed-measuring means adapted to energize the field winding with direct current at an instant of time to positively provide for substantially maximum pull-in torque of the motor at the moment of transfer from induction motor operation to synchronous motor operation, and means operable by the synchronization of the synchronous motor adapted to shunt said automatically operable high-speed transfer means to thus energize the field winding with direct current independent of said transfer means.

6. In a system of control for a synchronous motor comprising, in combination, a synchronous motor having an armature winding and a field winding, a source of alternating current, a source of direct current, means for connecting the armature winding to the source of alternating current to start the motor as an induction motor, high-speed means adapted to connect said field winding to said source of direct current, control means, responsive to the joint effect of the frequency of the energy supplied from said source of alternating current and the position of the field winding with reference to a given point on the alternating-current wave of the alternating current supplied to the motor, adapted to energize said high-speed means for connecting the field winding to the source of direct current whereby the energization of said field winding after the operation of said control means is practically independent of time, and means operable after the synchronization of the motor, namely, after pull-in, adapted to shunt the connections for energizing the field winding by said high-speed means to thus energize the field winding with direct current independent of the energizing circuit established for the field winding by said high-speed means.

7. A system of control for a synchronous motor comprising, in combination, a synchronous motor having an armature winding and a field winding, a source of alternating current, a source of direct current, means for connecting the armature winding to the source of alternating current to start the motor as an induction motor, high-speed means adapted to connect said field winding to said source of direct current whereby the energization of the field winding takes place in a very short, substantially negligible, interval of time after the energization of this said means adapted to connect the field winding to the source of direct current, control means, responsive to the joint effect of the frequency of the energy supplied from said source of alternating current and the position of the field winding, adapted to energize said high-speed means for connecting the field winding to the source of direct current, means operable after the motor has pulled into synchronism for connecting the field winding to the source of direct current independent of said high-speed means, and means, responsive to the speed of said motor, adapted to initiate the operation of said control means.

8. A system of control for a synchronous motor comprising, in combination, a synchronous motor having an armature winding and a field winding, a source of alternating current, a source of direct current, high-speed means adapted to connect said field winding to the source of direct current whereby the energization of the field winding takes place a substantially negligible interval of time after this said high-speed means operates to connect the field winding to the source of direct current, electronic discharge means adapted to cause the operation of the high-speed means, means responsive to the joint effect of the frequency of the energy supplied by the source of alternating current to the armature winding and the position of the field winding adapted to cause the operation of the said electric discharge means, and means operable after the synchronous motor has pulled into synchronism for connecting the field winding to the source of direct current.

9. A system of control for a synchronous motor comprising, in combination, a synchronous motor having an armature winding and a field winding, a source of alternating current, a source of direct current, high-speed means adapted to connect said field winding to the source of direct current whereby the energization of the field winding takes place a substantially negligible interval of time after this said high-speed means operates to connect the field winding to the source of direct current, electronic discharge means adapted to cause the operation of the high-speed means, means responsive to the joint effect of the frequency of the energy supplied by the source of alternating current to the armature winding and the position of the field winding adapted to cause the operation of the said electric discharge means, means operable after the synchronous motor has pulled into synchronism for connecting the field winding to the source of direct current, and means operable by the last mentioned means adapted to deenergize said high-speed means.

10. A system of control for a synchronous motor comprising, in combination, a synchronous motor having an armature winding, a field winding, and a damper winding, a source of alternating current, means for connecting said source of alternating current to the armature winding to thus start the motor as an induction motor by said damper winding, a source of direct current, high-speed switching means adapted to connect the field winding to said source of direct current whereby the field winding becomes energized in a substantially negligible interval of time after the operation of said high-speed means, high-speed control means, operable when the field winding occupies a selected position with reference to a given point on the rotating field of the armature winding adapted to cause the operation of said high-speed switching means, means responsive to the slip speed of the motor adapted to initiate the operation of the high-speed control means, and means operable after the motor has pulled into synchronism for also connecting the field winding to said source of direct current.

11. A system of control for a synchronous motor comprising, in combination, a synchronous motor having an armature winding, a field winding, and a damper winding, a source of alternating current, means for connecting said source of alternating current to the armature winding to thus start the motor as an induction motor by said damper winding, a source of direct current, high-speed switching means adapted to connect the field winding to said source of direct current whereby the field winding becomes energized in a substantially negligible interval of time after the operation of said high-speed means, high-speed control means, operable when the field winding occupies a selected position with reference to a given point on the rotating field of the armature winding adapted to cause the operation of said high-speed switching means, means responsive to the slip speed of the motor adapted to initiate the operation of the high-speed control means, means operable after the motor has pulled into synchronism for also connecting the field winding to said source of direct current, and means operable by the last-mentioned means for also connecting the field winding to the source of direct current adapted to deenergize said high-speed switching means.

12. A starting control system for a synchronous motor comprising, in combination, a synchronous motor having a stator, provided with an armature winding, a rotor, provided with a field winding, and a starting winding, a source of alternating current, means adapted to connect the armature winding to the source of alternating current to start the motor as an induction motor, a source of direct current, a high-speed field switch adapted to connect the field winding to the source of direct current in a substantially negligible interval of time after the energization of said high-speed field switch, and an electric discharge device adapted, when discharging, to cause substantially instantaneous operation of the high-speed field switch, an impulse generator and electric impulse producing means producing voltage impulses having frequencies equal to the frequency of the currents supplied to the armature by said source of alternating current, and a frequency proportional to the rotor slip, respectively, acting jointly on said electric discharge device to cause the same to break down or discharge when the field winding has a selected position with respect to the phases of the rotating field in the armature winding, and means responsive to the frequency of the currents induced in a winding on the pole pieces of the motor adapted to initiate the controlling effect of said impulse generator and electric impulse producing means on the electric discharge device.

13. In a system of control for starting a synchronous motor, in combination, an impulse generator, mounted in a selected relation with reference to the field windings of the motor, adapted to generate an impulse of electric energy which impulses will thus indicate each time the field winding occupies a given position in space, electric impulse producing means energized from a source of alternating current whereby impulses are produced of a frequency equal to the frequency of such source of alternating current, control means, responsive to the combined impulses of the impulse generator and the electric impulse producing means, adapted to energize the field winding of the motor with direct current, means responsive to the slip speed of the motor adapted to initiate the operation of said control means, and means operable after the motor has pulled into synchronism for deenergizing said control means.

CHARLES C. SHUTT.
JOHN W. DAWSON.